United States Patent
Jung et al.

(10) Patent No.: US 11,166,043 B2
(45) Date of Patent: Nov. 2, 2021

(54) METHODS AND DEVICES FOR ENCODING AND DECODING A MULTI-VIEW VIDEO SEQUENCE REPRESENTATIVE OF AN OMNIDIRECTIONAL VIDEO

(71) Applicant: ORANGE, Issy-Les-Moulineaux (FR)

(72) Inventors: Joel Jung, Chatillon (FR); Bappaditya Ray, Chatillon (FR)

(73) Assignee: ORANGE, Issy-Les-Moulineaux (FR)

( * ) Notice: Subject to any disclaimer, the term of this patent is extended or adjusted under 35 U.S.C. 154(b) by 0 days.

(21) Appl. No.: 16/772,497

(22) PCT Filed: Nov. 26, 2018

(86) PCT No.: PCT/FR2018/052978
§ 371 (c)(1),
(2) Date: Jun. 12, 2020

(87) PCT Pub. No.: WO2019/115899
PCT Pub. Date: Jun. 20, 2019

(65) Prior Publication Data
US 2020/0389670 A1    Dec. 10, 2020

(30) Foreign Application Priority Data
Dec. 15, 2017   (FR) ...................................... 1762251

(51) Int. Cl.
*H04N 19/597*   (2014.01)
*H04N 19/105*   (2014.01)
(Continued)

(52) U.S. Cl.
CPC ......... *H04N 19/597* (2014.11); *H04N 19/105* (2014.11); *H04N 19/176* (2014.11); *H04N 19/46* (2014.11)

(58) Field of Classification Search
CPC .. H04N 19/105; H04N 19/109; H04N 19/167; H04N 19/176; H04N 19/46; H04N 19/573; H04N 19/597
See application file for complete search history.

(56) References Cited

U.S. PATENT DOCUMENTS

2011/0243224 A1    10/2011  Su et al.
2018/0359487 A1*   12/2018  Bang ....................... H04N 19/40
(Continued)

FOREIGN PATENT DOCUMENTS

EP    1793609 A2      6/2007
EP    3349460 A1 *   7/2018  ........... H04N 19/503
WO    2017090988 A1  6/2017

OTHER PUBLICATIONS

English translation of the Written Opinion of the International Searching Authority dated Jun. 16, 2020 for corresponding International Application No. PCT/FR2018/052978, filed Nov. 26, 2018.
(Continued)

*Primary Examiner* — Francis Geroleo
(74) *Attorney, Agent, or Firm* — David D. Brush; Westman, Champlin & Koehler, P.A.

(57) ABSTRACT

Decoding an encoded data signal representing a multi-view video sequence representing an omnidirectional video and having a first view and a second view. The decoding includes reading from the signal parameters to obtain a homographic matrix, representing transformation of a plane of the second view into a plane of the second view. An image of the second view has an active zone including pixels which, when projected via the homographic matrix onto an image of the first view, are included in the image of the first view. An image of the second view is decoded by generating a reference image having pixel values determined from previously reconstructed pixels of an image of the first view and the homographic matrix and, for a block of the image of the
(Continued)

second view, the reference image generated is included in the list of reference images when the block belongs to the active zone.

16 Claims, 7 Drawing Sheets

(51) Int. Cl.
  *H04N 19/176* (2014.01)
  *H04N 19/46* (2014.01)

(56) References Cited

U.S. PATENT DOCUMENTS

2019/0007679 A1\* 1/2019 Coban .................. H04N 19/134
2019/0222862 A1\* 7/2019 Shin ........................ G06T 3/005

OTHER PUBLICATIONS

International Search Report and Written Opinion dated May 9, 2020 for corresponding International Application No. PCT/FR2018/052978, filed Nov. 26, 2018.
Yea S. et al., "View Synthesis Prediction for Multiview Video Coding", Signal Processing. Image Communication, Elsevier Science Publishers, Amsterdam, NL, vol. 24, No. 1-2, Jan. 1, 2009 (Jan. 1, 2009), pp. 89-100, XP025884347.

\* cited by examiner

METHODS AND DEVICES FOR ENCODING AND DECODING A MULTI-VIEW VIDEO SEQUENCE REPRESENTATIVE OF AN OMNIDIRECTIONAL VIDEO

CROSS-REFERENCE TO RELATED APPLICATIONS

This Application is a Section 371 National Stage Application of International Application No. PCT/FR2018/052978, filed Nov. 26, 2018, which is incorporated by reference in its entirety and published as WO 2019/115899 A1 on Jun. 20, 2019, not in English.

STATEMENT REGARDING FEDERALLY SPONSORED RESEARCH OR DEVELOPMENT THE NAMES OF THE PARTIES TO A JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

The invention relates to omnidirectional videos, such as in particular 360°, 180° videos, etc. More particularly, the invention relates to the encoding and decoding of such videos.

(2) Description of Related Art Including Information Disclosed Under 37 CFR 1.97 and 1.98

360° videos are captured by cameras installed on a spherical platform. These cameras are said to be divergent because they are placed so as to capture a scene in all directions. Each camera captures part of the scene, all the views captured by the cameras allowing to generate a video representing the scene according to a 360° field of vision.

Such 360° videos then allow the user to look at the scene as if he was placed in the centre of the scene and to look all around him, at 360°, thus providing a new way of watching videos. Such videos are generally reproduced on virtual reality headsets, also known by the name HMD for "Head Mounted Devices". But, they can also be displayed on 2D screens equipped with adapted user interaction means. The number of cameras to capture a 360° scene varies depending on the platforms used.

However, regardless of the platform used, two neighbouring cameras each capture part of the scene with an overlap in the data captured by these two cameras. In other words, a part of the scene captured in 360° is common between two views each captured respectively by two neighbouring cameras. This is illustrated in FIG. 1 showing two views: a view 1 captured by a first camera and a view 2 captured by a second camera placed on the right of the first camera. In FIG. 1, the area on the right in view 1 (framed in solid line) corresponds to the same part of the captured scene as the area on the left in view 2 (framed in solid line). There is therefore an overlap of the scene data between views 1 and 2. Such an overlap is necessary to allow a continuous transition when the user traverses the visual field provided by the 360° video.

To generate a 360° video, the divergent views captured by the different cameras are placed end to end taking into account the overlaps between views, to create a panoramic 2D view. This step is also known as "stitching". For example, an EquiRectangular projection (ERP) is a possible projection to obtain such a panoramic image. According to this projection, the images of each view are projected onto a spherical surface. Other types of projections are also possible, such as a Cube Mapping type projection (projection on the faces of a cube). The images projected on a surface are then projected on a 2D plane to obtain a 2D image comprising at a given instant all the views of the captured scene.

The 2D images thus obtained are then encoded using a conventional 2D video encoder, for example an encoder conforming to the HEVC (abbreviation for "High Efficiency Video Coding") standard.

The main disadvantage of this technique is that when the 360° video is returned to a user, it is possible to change the point of view by turning around a static central point, but it is not possible to displace from this central point, for example by moving a few centimetres to the left, the right, forward or backward. In other words, to change the point of view, only rotations are allowed, any other movement, in particular translations, being excluded. Such a technique thus provides 3 degrees of freedom (3DoF for 3 Degree Of Freedom), but it does not provide natural movement according to 6 degrees of freedom (6DoF).

This disadvantage is all the more annoying that even when the user only performs a rotational movement, there are in fact many small parasitic translational movements. Such translational movements are not rendered correctly, which has the consequence of displaying to the user pixels which do not perfectly correspond to what is expected by the user's brain. This is one of the main causes of the discomfort felt by users of the HMD-type equipment.

The MV-HEVC and 3D-HEVC encoders are used to encode multi-view content. Such encoders exploit the inter-view similarities of multi-view content. However, such encoders are designed to handle multiple linear or convergent views, captured by cameras having different centres, positioned outside the scene. Thus, in these encoders, the distance between two camera centres, called "baseline distance", is used to calculate a disparity, with the help of a depth map. The disparity is then used for the prediction of some blocks via a prediction by disparity compensation, which allows exploiting the inter-view similarities when encoding the images of the video sequence.

In the case of 360° videos, the views being divergent, such multi-view encoders are not optimal for encoding the views of a 360° video, the inter-view prediction will be little, or even not used by the encoder. Indeed, between two views of a 360° video, there is little similar content that can be predicted between views.

In addition, the overlapping area between two neighbouring views is not completely similar. Indeed, the pixels of the overlapping area have undergone geometric transformations between views, and a simple copying of the pixels from one view to another in the overlapping area leads to ineffective inter-view prediction.

There is therefore a need to improve the state of the art.

SUMMARY

The invention improves the state of the art. To this end, it relates to a method for decoding an encoded data signal representative of a multi-view video sequence representative of an omnidirectional video, the multi-view video sequence comprising at least one first view and one second view. Such a decoding method comprises:

reading in the data signal, parameters allowing to obtain a homographic matrix representative of the transformation from a plane of the second view to a plane of the first view, decoding an image of the second view, the image of the second view comprising an area called active area comprising pixels which, when said pixels are projected via the homographic matrix onto an image of the first view, are comprised in the image of the first view, the decoding of the image of the second view comprising:

generating a reference image comprising pixel values determined from previously reconstructed pixels of an image of the first view and from the homographic matrix, and for at least one block of the image of the second view:

reading in the data signal, an index representative of a reference image comprised in a list of reference images comprising at least one image of the second previously reconstructed view, determining whether the block belongs to the active area or not, reconstructing said block from said reference image indicated by the index read, the generated reference image being comprised in said list of reference images when said block belongs to the active area, and the generated reference image not being comprised in said list of reference images when said block does not belong to the active area.

The method according to the invention thus allows improving the compression performance of a multi-view encoder encoding divergent views, by exploiting the redundancies between neighbouring views for the blocks belonging to the inter-view overlapping areas.

Advantageously, the inter-view prediction is improved by taking into account a homographic matrix allowing to compensate for the geometric distortions between views.

The inter-view overlapping area is determined using the homographic matrix representing the transformation from an image plane of the first view to the image plane of the second view. According to the invention, for blocks belonging to the active area of the image to be decoded, the prediction is improved by the possibility of taking into account a new reference image generated thanks to the homographic matrix and to an image of a previously reconstructed view. Such a new reference image is only available for blocks belonging to the active area. Thus, the insertion of such a new reference image in the list of reference images does not affect the cost of signalling reference images for the other blocks which do not belong to the active area.

The location of the blocks belonging to the active area is directly deduced from the projection of the pixels of the image to be decoded via the homographic matrix on the previously reconstructed image, so that it is not necessary to encode additional information to indicate whether these blocks can use the new reference image or not.

When the block does not belong to the active area, it is for example conventionally reconstructed using pixels which are previously reconstructed by intra prediction, or belonging to another image of the same view previously encoded and decoded, by inter-image prediction. Advantageously, the reference image is defined in the plane of the second view. More particularly, the active area is determined in the image of the second view by all the pixels which are projected into the image of the first view using the homographic matrix.

Thus, the new reference image comprises pixels called active pixels corresponding to the pixels of the image of the second view projected onto the image of the first view by the homographic matrix. The rest of the pixels of the reference image, having no correspondence in the image of the first view, are called non-active pixels.

The various embodiments or features mentioned below can be added independently or in combination with each other, to the features of the decoding method defined above.

According to a particular embodiment of the invention, the parameters are camera parameters associated respectively with a first camera associated with the first view and with a second camera associated with the second view, the method further comprising the calculation of said homographic matrix from said camera parameters.

According to this particular embodiment of the invention, the homographic matrix is calculated during decoding, from camera parameters encoded in the data signal representative of the multi-view sequence, such as in particular the focal length of each camera and the angular separation representing the angle of rotation between the camera of the first view and the camera of the second view.

According to another particular embodiment of the invention, the parameters are the coefficients of the homographic matrix.

According to this particular embodiment of the invention, it is not necessary to recalculate the homographic matrix upon decoding. Its coefficients are calculated at the encoder and transmitted in the data signal representative of the multi-view sequence. This results in lower calculation complexity at the decoder.

According to another particular embodiment of the invention, when the border of the active area crosses the block to be reconstructed, the decoding method further comprises:

reading, in the data signal, another index representative of a reference image comprised in the group of reference images, said group of reference images not comprising the generated reference image, the pixels of the block to be reconstructed which do not belong to the active area being reconstructed from pixels of the reference image indicated by the other index read.

This particular embodiment of the invention allows providing a segmentation of the blocks located at the border of the active area, without requiring the encoding of information to encode this segmentation and to adapt the prediction of the pixels of these blocks according to the position of the pixels in the block relative to the border.

According to another particular embodiment of the invention, the decoding method further comprises:

reading in the data signal, parameters allowing to obtain another homographic matrix representative of the transformation from a plane of the second view to a plane of a third view, at least one pixel of the image of the second view projected into an image of the third view via the other homographic matrix being comprised in the image of the third view, the generated reference image further comprises pixel values determined from previously reconstructed pixels of the image of the third view and the other homographic matrix.

This particular embodiment of the invention allows taking into account an image of another previously reconstructed view to generate the new reference image. Thus, when another view is also available to predict the second view, the area of non-active pixels is reduced. Indeed, the other homographic matrix allowing to switch from the second view to the third view allows defining a new active area in the reference image corresponding to the pixels which when they are projected via the other homographic matrix onto an image of the third view, are comprised in the image of the third view.

The invention also relates to a method for encoding in a data signal, a multi-view video sequence representative of an omnidirectional video, the multi-view video sequence comprising at least one first view and one second view. The encoding method comprises:

calculating a homographic matrix representative of the transformation from a plane of the second view to a plane of the first view, encoding, in the data signal, parameters allowing to obtain said homographic matrix upon decoding, encoding an image of the second view, the image of the second view comprising an area called active area comprising pixels which, when said pixels are projected via the homographic matrix onto an image of the first view, are comprised in the image of the first view, the encoding of said image comprising:

generating a reference image comprising pixel values determined from previously reconstructed pixels of an image of the first view and from the homographic matrix, and for at least one block of the image of the second view:
determining whether the block belongs to the active area or not,
predicting said block from a reference image comprised in a list of reference images comprising at least one image of the second previously reconstructed view, the generated reference image being comprised in said list of reference images when said block belongs to the active area, and the generated reference image is not comprised in said list of reference images when said block does not belong to the active area,
encoding in the data signal, an index representative of the reference image used to predict said block.

According to a particular embodiment of the invention, the parameters are camera parameters associated respectively with a first camera associated with the first view and with a second camera associated with the second view.

According to another particular embodiment of the invention, the parameters are the coefficients of the homographic matrix.

According to another particular embodiment of the invention, when the border of the active area crosses the block to be encoded, the encoding method further comprises:

encoding, in the data signal, another index representative of a reference image comprised in the group of reference images, said group of reference images not comprising the generated reference image, the pixels of the block to be encoded which do not belong to the active area being predicted from pixels of the reference image indicated by the other index.

According to another particular embodiment of the invention, the encoding method further comprising:

calculating another homographic matrix representative of the transformation from a plane of the second view to a plane of a third view, at least one pixel of the image of the second view projected into an image of the third view via the other homographic matrix being comprised in the image of the third view, encoding in the data signal, parameters allowing to obtain said other homographic matrix, the generated reference image further comprises pixel values determined from previously reconstructed pixels of the image of the third view and from the other homographic matrix.

The invention also relates to a device for decoding an encoded data signal representative of a multi-view video sequence representative of an omnidirectional video, the multi-view video sequence comprising at least one first view and one second view, the decoding device comprises:

means for reading, in the data signal, parameters allowing to obtain a homographic matrix representative of the transformation from a plane of the second view to a plane of the first view, means for decoding an image of the second view, the image of the second view comprising an area called active area comprising pixels which when said pixels are projected via the homographic matrix onto an image of the first view, are comprised in the image of the first view, said means for decoding the image of the second view comprising:

means for generating a reference image comprising pixel values determined from previously reconstructed pixels of an image of the first view and from the homographic matrix, and for at least one block of the image of the second view:
means for reading in the data signal, an index representative of a reference image comprised in a list of reference images comprising at least one image of the second previously reconstructed view,
means for determining whether the block belongs to the active area or not,
means for reconstructing said block from said reference image indicated by the index read, the generated reference image being comprised in said list of reference images when said block belongs to the active area, and the generated reference image is not comprised in said list of reference images when said block does not belong to the active area.

The invention also relates to a device for encoding in a data signal, a multi-view video sequence representative of an omnidirectional video, the multi-view video sequence comprising at least one first view and one second view, the encoding device comprises:

means for calculating a homographic matrix representative of the transformation from a plane of the second view to a plane of the first view, means for encoding in the data signal parameters allowing to obtain said homographic matrix, means for encoding an image of the second view, the image of the second view comprising an area called active area comprising pixels which, when said pixels are projected via the homographic matrix onto an image of the first view, are comprised in the image of the first view, said means for encoding said image comprising:

means for generating a reference image comprising pixel values determined from previously reconstructed pixels of an image of the first view and from the homographic matrix, and for at least one block of the image of the second view:
means for determining whether the block belongs to the active area or not,
means for predicting said block from a reference image comprised in a list of reference images comprising at least one image of the second previously reconstructed view, the generated reference image being comprised in said list of reference images when said block belongs to the active area, and the generated reference image not being comprised in said list of reference images when said block does not belong to the active area,
means for encoding in the data signal, an index representative of the reference image used to predict said block.

According to a particular embodiment of the invention, the decoding method, respectively the encoding method, is implemented by a computer program. The invention also relates to a computer program including instructions for implementing the decoding method or the encoding method according to any one of the particular embodiments described above, when said program is executed by a processor. Such a program can use any programming language. It can be downloaded from a communication network and/or saved on a computer-readable medium. This program can use any programming language, and be in the form of source code, object code, or intermediate code between source code and object code, such as in a partially compiled form, or in any other desirable form.

The invention also relates to a recording medium or information medium readable by a computer, and including instructions of a computer program as mentioned above. The recording media mentioned above can be any entity or device capable of storing the program. For example, the medium may include a storage means, such as a ROM, for example a CD ROM or a microelectronic circuit ROM, or else a magnetic recording means, for example a floppy disc or a hard disc. On the other hand, the recording media can correspond to a transmissible medium such as an electrical or optical signal, which can be routed via an electrical or optical cable, by radio or by other means. The program according to the invention can particularly be downloaded from a network of the Internet type. Alternatively, the recording media can correspond to an integrated circuit wherein the program is incorporated, the circuit being adapted to execute or to be used in the execution of the methods in question.

BRIEF DESCRIPTION OF THE SEVERAL VIEWS OF THE DRAWINGS

Other features and advantages of the invention will appear more clearly upon reading the following description of a particular embodiment, given by way of simple illustrative and non-limiting example, and of the appended drawings, among which.

DETAILED DESCRIPTION OF ILLUSTRATIVE EMBODIMENTS

1 General Principle

One of the purposes of the invention is to improve the encoding of an omnidirectional video when such a video is encoded by a multi-view encoder, wherein each view is encoded by temporal prediction relative to images of the same previously encoded view or by inter-view prediction relative to an image of another view.

In order to improve the inter-view prediction when encoding a view of an omnidirectional video, a new reference image is generated from previously encoded images of views neighbouring the view to be encoded. More particularly, a homographic matrix allowing to project pixels from a view to be encoded or decoded to an image of a view adjacent to the view to be encoded or decoded is calculated. The pixels of the view to be encoded or decoded projecting in the borders of the image of the adjacent view then define an active area of the image to be encoded or decoded. Such an active area can then be predicted from the pixels of the image of the adjacent view when these pixels have been previously reconstructed. The inter-view prediction is thus improved when encoding a view of an omnidirectional video by taking into account the areas of inter-view overlap.

Advantageously, to encode or decode an image block of a current view, a new reference image is created from the previously reconstructed pixels of the adjacent view and from the homographic matrix. When the block to be encoded or decoded at least partly belongs to the active area of the image to be encoded or decoded, this new reference image can then be used in the list of reference images.

Thus, the cost of signalling this new reference image does not impact the encoding of the other blocks not belonging to the active area.

2 Examples of Implementation

Figure 1:
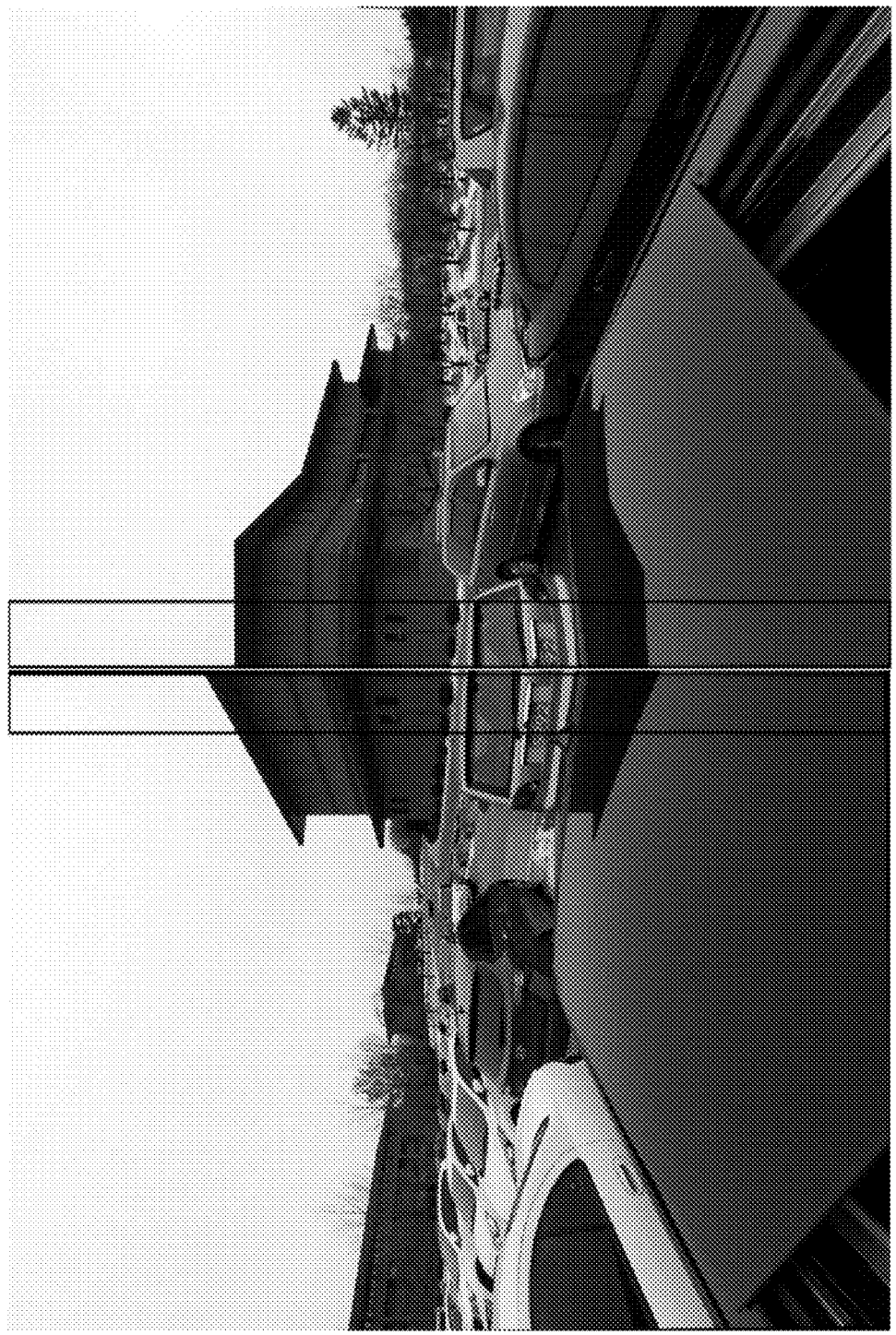
FIG. 1 illustrates two divergent views captured by two cameras and having an overlapping area, FIG. 2 schematically illustrates an example of capturing divergent views, FIG. 3 schematically illustrates two examples of views having one or two overlapping area(s) with adjacent views placed according to the system illustrated in FIG. 2, FIG. 4 schematically illustrates steps of the method for encoding an omnidirectional video according to a particular embodiment of the invention.
Figure 2:
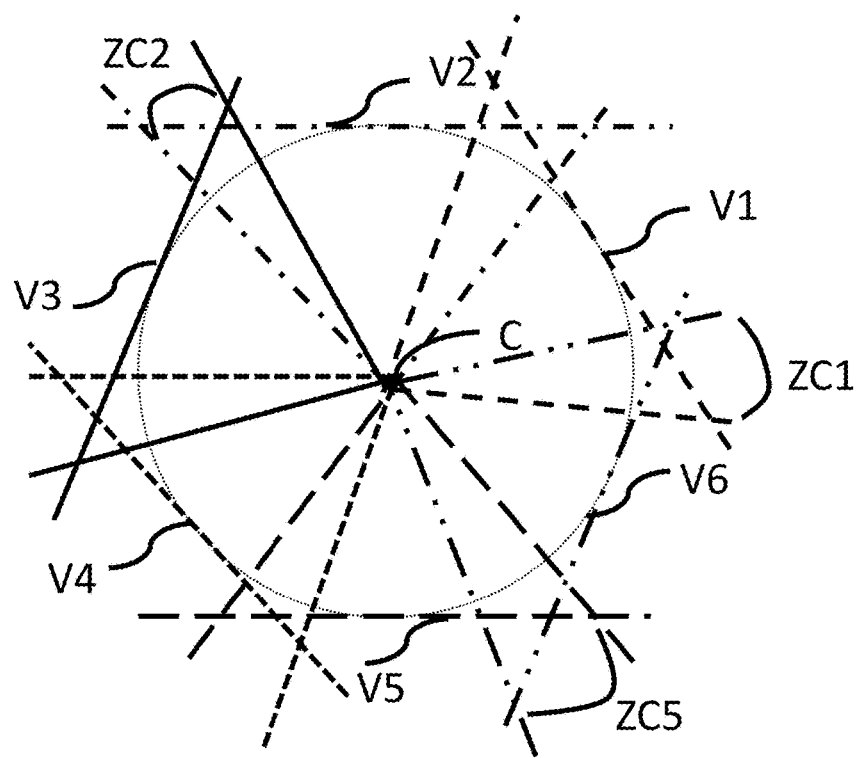

FIG. 2 schematically illustrates an example of divergent view capturing wherein six views (V1-V6) are captured respectively from six cameras placed on a platform represented by the point C in FIG. 2. In FIG. 2, the field of vision of each camera is represented by solid or dotted lines and the image plane of the view associated with each camera is represented using the same solid or dotted lines as the field of vision of the camera. It appears that for each view, an overlapping area exists between the current view and the left, respectively right view. In other words, two adjacent or neighbouring views have pixels representative of the same 3D data of the scene captured respectively by each camera. For example, in FIG. 2, the area ZC1 illustrates the overlap between the views V1 and V6, the area ZC2 illustrates the overlap between the views V2 and V3 and the area ZC5 illustrates the overlap between the views V5 and V6.

However, in order to use information from an overlapping area of an adjacent view for encoding a current view, it is necessary that the adjacent view has previously been encoded and reconstructed.

Thus, for example if the order of encoding of the views is V1, V2, V3, V4, V5 and V6, the view V1 is encoded without prediction relative to an overlapping area since no view has yet been encoded. An image of the view V1 will for example be encoded by temporal prediction relative to previously encoded images of the view V1.

The encoding of the views V2, V3, V4 and V5 may implement a temporal prediction relative to previously encoded images of the same view and/or an inter-view prediction using the overlapping area between the current view V2 respectively, V3, V4 and V5 and the right view V1, respectively V2, V3, V4.

The encoding of view V6 may use a temporal prediction relative to previously encoded images of the same view and/or an inter-view prediction using the overlapping area between the current view V6 and the right view V5 and and/or an inter-view prediction using the overlapping area between the current view V6 and the left view V1.

Figure 3:
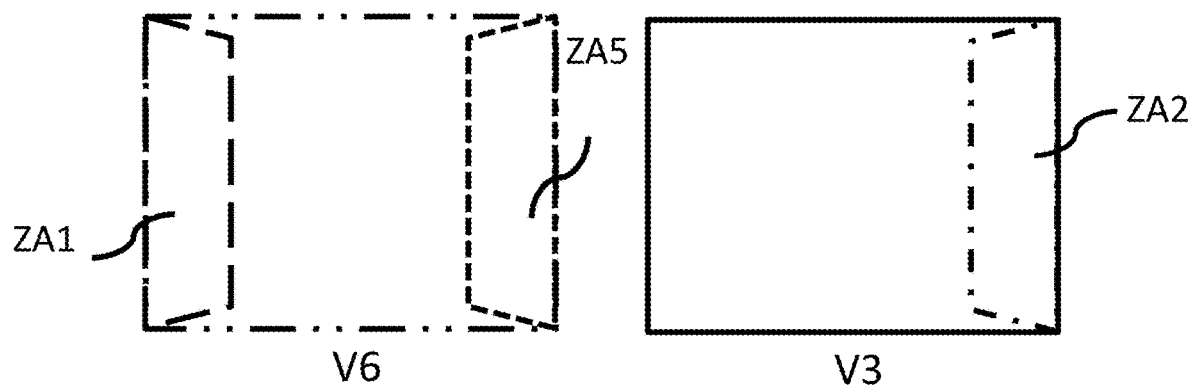

For example, as illustrated in FIG. 3, for the view V6, the area ZA1 representative of the overlap of the view V1 with the view V6 and the overlapping area ZA5 representative of the overlap of the view V5 with the view V6 can be used for the prediction of the view V6.

According to another example, for view V3, the area ZA2 representative of the overlap of view V2 with view V3 could be used for the prediction of the view V3.

The methods for encoding and decoding an omnidirectional video described below generally apply to the case of multi-view image sequences having N views, N being an integer greater than or equal to 2.

The methods for encoding and decoding an omnidirectional video are generally described below, and can be integrated into any type of multi-view video encoder/decoder, for example the 3D-HEVC or MV-HEVC standard, or other.

Figure 4:
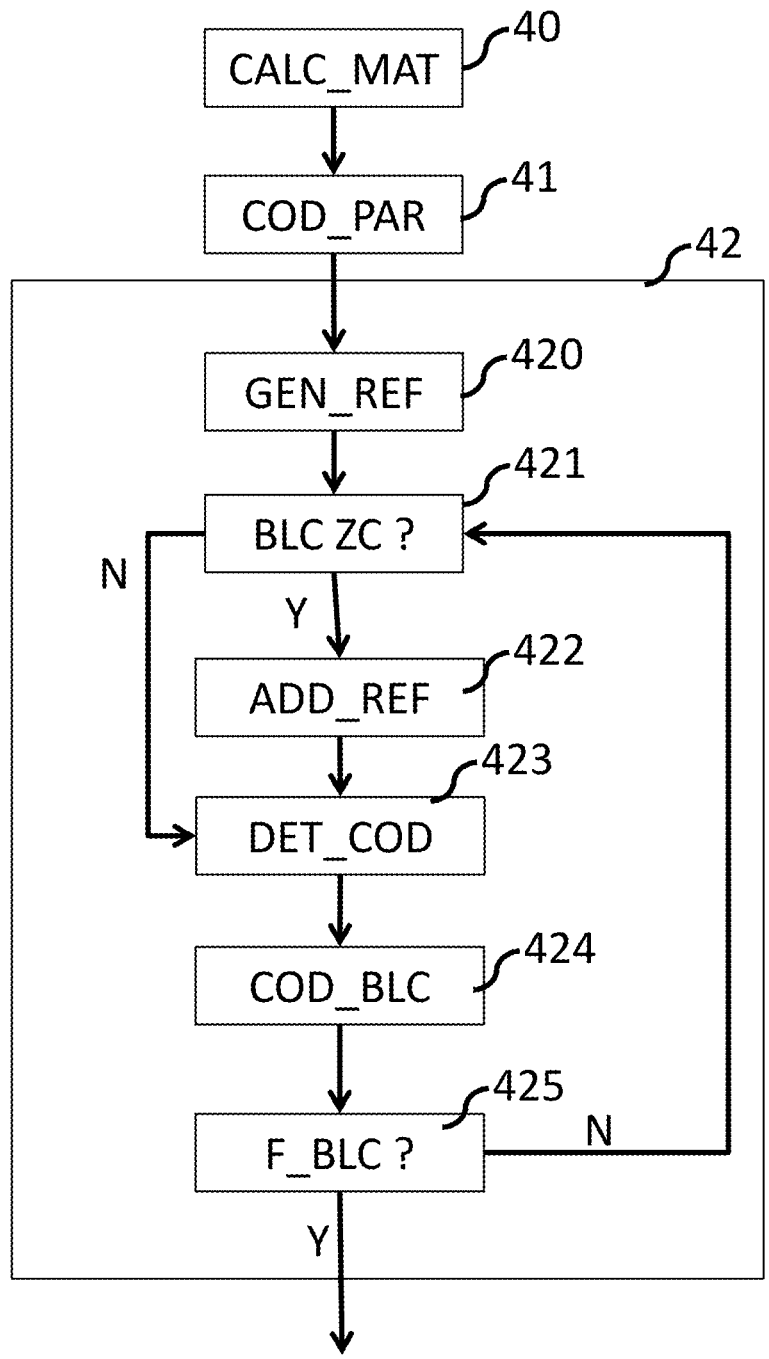

FIG. 4 schematically illustrates steps of the method for encoding an omnidirectional video according to a particular embodiment of the invention.

During a step 40, for each view k to be encoded, a homographic matrix is calculated to represent the transformation from a plane of a view k to be encoded to a plane of a view (k−1 for example) adjacent to the view k to be encoded. It is considered here that the image of the view adjacent to the view to be encoded has previously been encoded and reconstructed. Therefore, it is considered here that the images of the view k−1 have been previously encoded and reconstructed, by temporal prediction relative to images previously encoded and reconstructed of the same view or by inter-view prediction.

When the current view k to be encoded is adjacent on each side to two previously encoded and reconstructed views, two homographic matrices are calculated, each corresponding respectively to the transformation from a plane of the view to be encoded to a plane of the right view and to the transformation from a plane of the view to be encoded to a plane of the left view.

The encoding of a view k is considered below, an adjacent view k−1 having been previously encoded and reconstructed and having an overlapping area with the view k.

It is considered here that a view k has an overlapping area with the view k−1 if at least one pixel of an image of the view k is projected onto an image of the view k−1. Such a pixel is then in an area called active area of the image of the view k.

During step 40, the homographic matrix between the adjacent view k−1 and the current view k to be encoded is calculated from the camera parameters associated respectively with the adjacent view k−1 and with the current view k.

Figure 11:
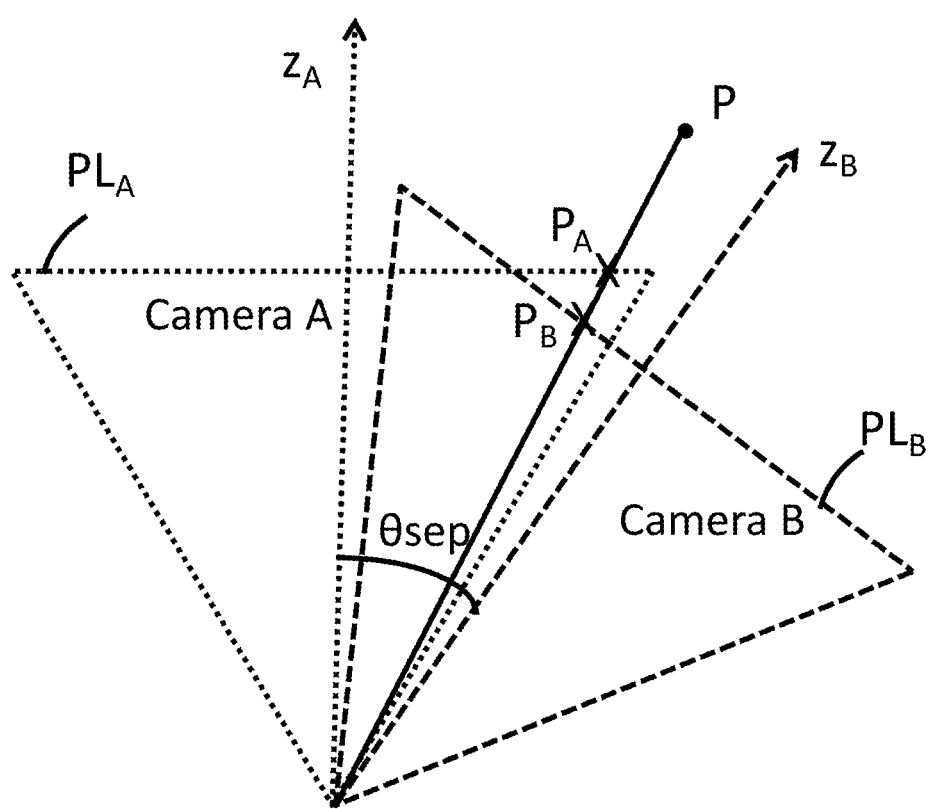
FIG. 11 illustrates the projection of a point P of the 3D space on two image planes respective of two divergent cameras A and B.

The calculation of the homographic matrix is described in relation to FIG. 11 wherein the capturing fields of two divergent cameras A and B are represented. The main axis of camera A is the axis $z_A$, corresponding to the axis perpendicular to the image plane $PL_A$ of the camera A. The adjacent camera B is rotated at an angle of $\theta_{sep}$ relative to the axis $Z_A$ of the camera A. The main axis of the camera B is the axis $z_B$, corresponding to the axis perpendicular to the image plane $PL_B$ of the camera B.

A point P(px,py,pz) of the 3D space is projected in the image plane $PL_A$ of camera A in $P_A$(pax,pay) and in the image plane $PL_B$ of camera B in $P_B$(pbx,pby). The relation between the points P, $P_A$, $P_B$ is given by:

$$P_A = K_A P \tag{1}$$

$$P_B = K_B R_{A2B} P \tag{2}$$

where $K_A$ and $K_B$ represent the intrinsic parameters of cameras A and B such as:

$$K_A = \begin{bmatrix} f_A & 0 & 0 \\ 0 & f_A & 0 \\ 0 & 0 & 1 \end{bmatrix}, K_B = \begin{bmatrix} f_B & 0 & 0 \\ 0 & f_B & 0 \\ 0 & 0 & 1 \end{bmatrix},$$

with $f_A$ and $f_B$ the focal length of cameras A and B respectively. $R_{A2B}$ represents the rotation of the main axis $z_A$ of camera A towards the main axis $z_B$ of camera B, corresponding to a clockwise rotation of an angle $\theta_{sep}$ about the y axis. $R_{B2A}$ represents the rotation of the main axis $z_B$ of camera B towards the main axis $z_A$ of camera A, corresponding to a counter-clockwise rotation of an angle $\theta_{sep}$ about the y axis.

$$R_{A2B} = R_{B2A}^{-1} = \begin{bmatrix} \cos(\theta sep) & 0 & -\sin(\theta sep) \\ 0 & 1 & 0 \\ \sin(\theta sep) & 0 & \cos(\theta sep) \end{bmatrix}$$

Equation (2) can then be written:

$$P = (K_B R_{A2B})^{-1} P_B = R_{A2B}^{-1} K_B^{-1} P_B$$

By substituting the value of P given by equation (1), the relation between $P_A$ and $P_B$ can be deduced by:

$$P_A = K_A R_{A2B}^{-1} K_B^{-1} P_B = H P_B$$

$$H = K_A R_{A2B}^{-1} K_B^{-1} = K_A R_{B2A} K_B^{-1} \tag{3}$$

The points $P_A$ and $P_B$ are therefore connected via the homography matrix H.

The parameters of the matrix H can thus be obtained from the focal lengths of the cameras A and B and the angular deviation $\theta_{sep}$ between the two cameras.

During step 40, the parameters of a homography matrix $H_{k,k-1}$ representing the transformation from view k to view k−1 are calculated from the focal lengths of the cameras associated respectively with the views k and k−1 and the separation angle $\theta_{sep}$ between the two cameras. During a step 41, parameters allowing to obtain the homography matrix $H_{k,k-1}$ are encoded in the data signal representative of the omnidirectional video.

According to one variant, the 9 coefficients of the 3×3 homographic matrix $H_{k,k-1}$ are encoded in the signal.

According to another variant, the intrinsic and extrinsic parameters of the cameras of view k−1 and of view k are encoded in the signal, i.e. the focal lengths of the cameras and the angle of separation $\theta_{sep}$ between the two cameras. According to this variant, the homography matrix $H_{k,k-1}$ will have to be recalculated at the decoder.

Following step 41, the current view k is encoded in the data signal image by image. During a step 42, a current image $I_t^k$ of a time instant t of the view k is encoded.

For this purpose, during a step 420, a new reference image $I_{ref}$ is created. The new reference image $I_{ref}$ is created from the pixels of an image $\overline{I_t^{k-1}}$ at the same time instant t of the adjacent view k−1 and which has been previously encoded and reconstructed. For this purpose, for each pixel of the reference image, the pixel (x, y) of the reference image is projected by the homographic matrix $H_{k,k-1}$ at a point (x', y') in the reference frame of the view k−1. The pixel (x, y) is projected into the image $\overline{I_t^{k-1}}$ of the view k−1 if the point (x', y') belongs to the image $\overline{I_t^{k-1}}$. If the projected pixel does not belong to the image $\overline{I_t^{k-1}}$, i.e. if the projected pixel is outside the borders of the image, the value of the pixel in the reference image is set to a default value, for example 128. The pixel is called non-active pixel.

If the projected pixel is in the image $\overline{I_t^{k-1}}$, i.e. if the projected pixel is within the borders of the image, the value of the pixel in the reference image is then obtained from the image pixels $\overline{I_t^{k-1}}$. The pixel is then called active pixel.

If the projected pixel corresponds to a pixel of the grid of the image $\overline{I_t^{k-1}}$, the value of the pixel projected in the reference image then takes the value of the corresponding pixel of the image $\overline{I_t^{k-1}}$. Otherwise, if the projected pixel is located at a sub-pixel position in the image $\overline{I_t^{k-1}}$, the value of the pixel projected in the reference image is interpolated conventionally from the value of the pixels of the grid of the image $\overline{I_t^{k-1}}$ surrounding the position of the pixel projected in the image $\overline{I_t^{k-1}}$.

The active and non-active pixels thus define an active area and a non-active area in the reference image.

In the case where the view k to be encoded has another adjacent view k+1 previously encoded and reconstructed, the step 420 is iterated this time using the homographic matrix calculated between the view k and the view k+1 and the image $\overline{I_t^{k+1}}$ from the view k+1.

Figure 5:
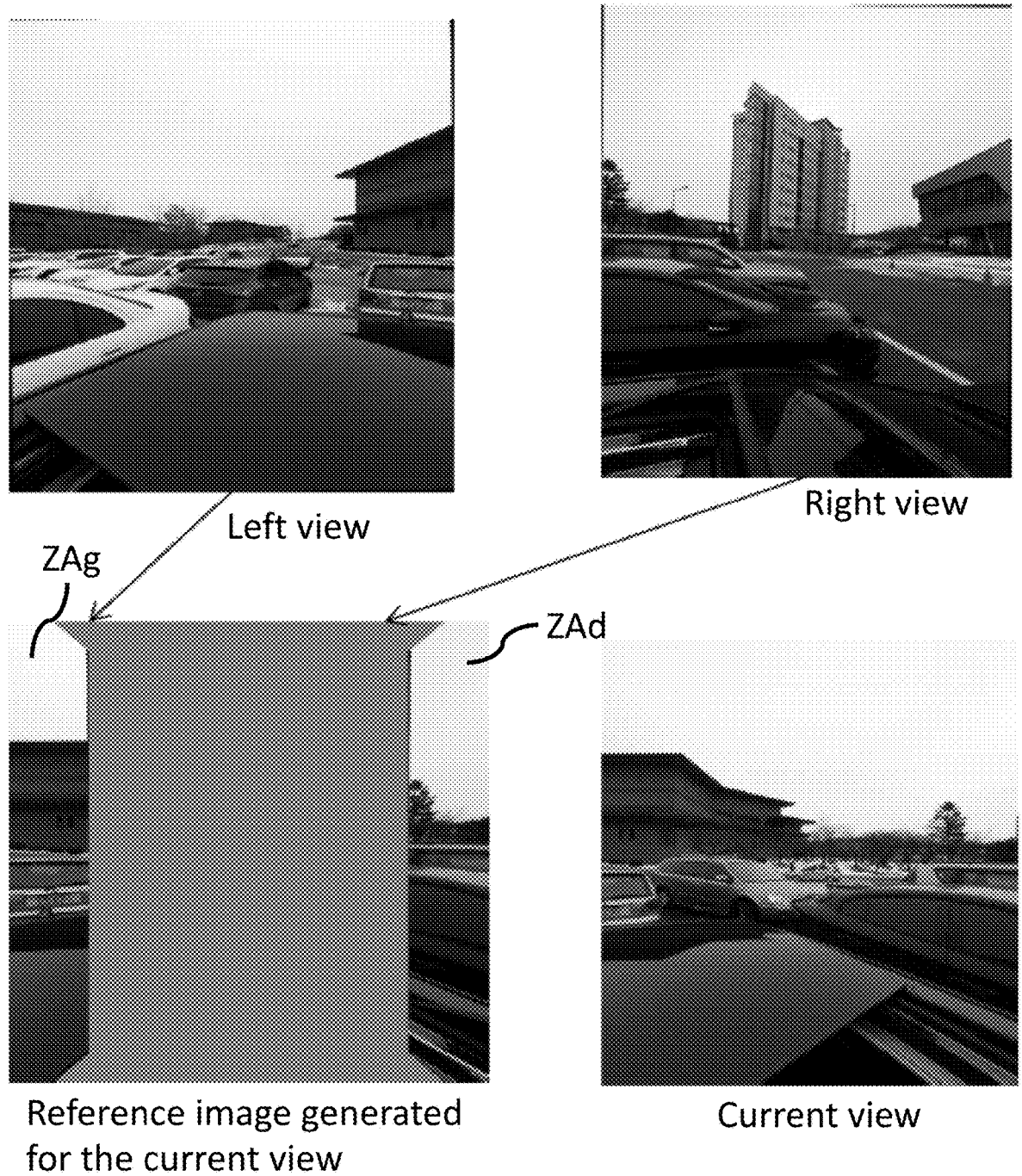
FIG. 5 illustrates an example of a reference image generated according to a particular embodiment of the invention for a central view to be encoded or decoded, from a view on the left and a view on the right of the central view, FIG. 6 schematically illustrates steps of the method for decoding an omnidirectional video according to a particular embodiment of the invention.

FIG. 5 illustrates an example of a reference image generated according to a particular embodiment of the invention for a current view, from a neighbouring view on the left and from a neighbouring view on the right of the current view. In the example of FIG. 5, two homography matrices were used, one for each adjacent left and right view. It appears that only the overlapping areas between adjacent views are reconstructed in the reference image via the projection by the homographic matrices. Indeed, in FIG. 5, the reference image presents a non-active area (grey area) and two active areas ZAg and ZAd respectively representative of the overlap of the current view with the left view, respectively with the right view.

Referring again to FIG. 4, the current image $I_t^k$ of the view k is then encoded. For this purpose, the image is cut into blocks of pixels and the blocks of pixels of the image are scanned to be encoded by spatial, temporal or inter-view prediction, as will be seen below.

For each block $B_k$ of the current image $I_t^k$, the following steps are implemented.

During a step 421, it is determined whether the block $B_k$ is located in the active area of the current image. In other words, it is determined whether the block $B_k$ comprises active pixels.

It should be noted that the reference image being represented in the image plane of the current view to be encoded, the active and non-active areas in the image of the current view to be encoded correspond to those of the reference image.

Thus, according to the particular embodiment of the invention described here, the block $B_k$ belongs to the active area if all the pixels of the block $B_k$ are active, i.e. if all the pixels of the block $B_k$ are in the active area.

If the block $B_k$ belongs to the active area, during a step 422, the new reference image $I_{ref}$ is added to the list of reference images to encode the block $B_k$. Otherwise, i.e. if the block $B_k$ does not belong to the active area, the list of reference images for encoding the block $B_k$ is unchanged and comprises only previously reconstructed images of the current view k to be encoded.

During a step 423, an encoding mode of the block $B_k$ is determined. For example, a rate-distortion optimisation is implemented during which all the encoding modes available for the block $B_k$ are put into competition. More particularly, during rate-distortion optimisation, conventionally, encoding modes by spatial or intra-image prediction are tested and encoding modes by temporal prediction using the list of reference images are tested.

According to the particular embodiment of the invention described here, advantageously the conventional operation of the encoders for determining an encoding mode for a current block is not modified. Indeed, when the block $B_k$ is located in the active area, the new reference image has been added to the list of reference images. Thus, the rate-distortion optimisation will select an encoding mode using a prediction relative to the new reference image created during step 420 if this encoding mode is more advantageous for the block $B_k$ than a conventional intra- or inter-encoding mode. Conventionally, when the temporal prediction encoding modes are tested, the movement between the current block and a block of pixels in a reference image of the list of reference images is estimated, for example by a block matching method.

During a step 424, when the best encoding mode is determined for the block $B_k$, the data of the block are encoded in the data signal. Conventionally, a prediction block is constructed according to the encoding mode determined during step 423.

Particularly, if the encoding mode determined in step 423 uses a prediction relative to the new reference image, the prediction block corresponds to the block of pixels in the new reference image pointed by the movement vector or the disparity information of the current block $B_k$ determined, for example in step 423.

A residue block is obtained by calculating the difference between the current block $B_k$ and the prediction block. The prediction residue is transformed, for example by a DCT type transform (for "Discrete Cosine Transform"), quantified and encoded by an entropy encoder. The prediction mode is also encoded in the data signal, as well as the associated encoding parameters, such as movement or disparity vectors, index of the reference image used for prediction.

Conventionally, the current block $B_k$ is reconstructed to serve as a prediction for the encoding of the following blocks.

During step 425, it is checked whether all the blocks of the current image have been encoded. If there are still blocks to be encoded, the method switches to the next block in the image to be encoded and returns to step 421. Otherwise, the encoding of the current image ends. The reconstructed current image is memorised to serve as a reference image for encoding the following images or subsequent views.

Figure 10A:
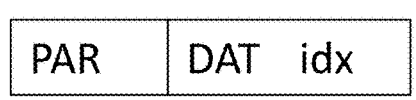

FIG. 10A schematically illustrates an example of encoded data signal representative of an omnidirectional video according to the particular embodiment of the invention described in relation to FIG. 4. Such a data signal comprises parameters PAR allowing to obtain a homographic matrix representative of the transformation from a plane of a view k to a plane of a neighbouring view k−1. For each image of the view k, encoded data DAT comprise, for at least one block of the active area of the image, an index idx indicating a reference image from a list of reference images, to be used to reconstruct the block.

Figure 6:
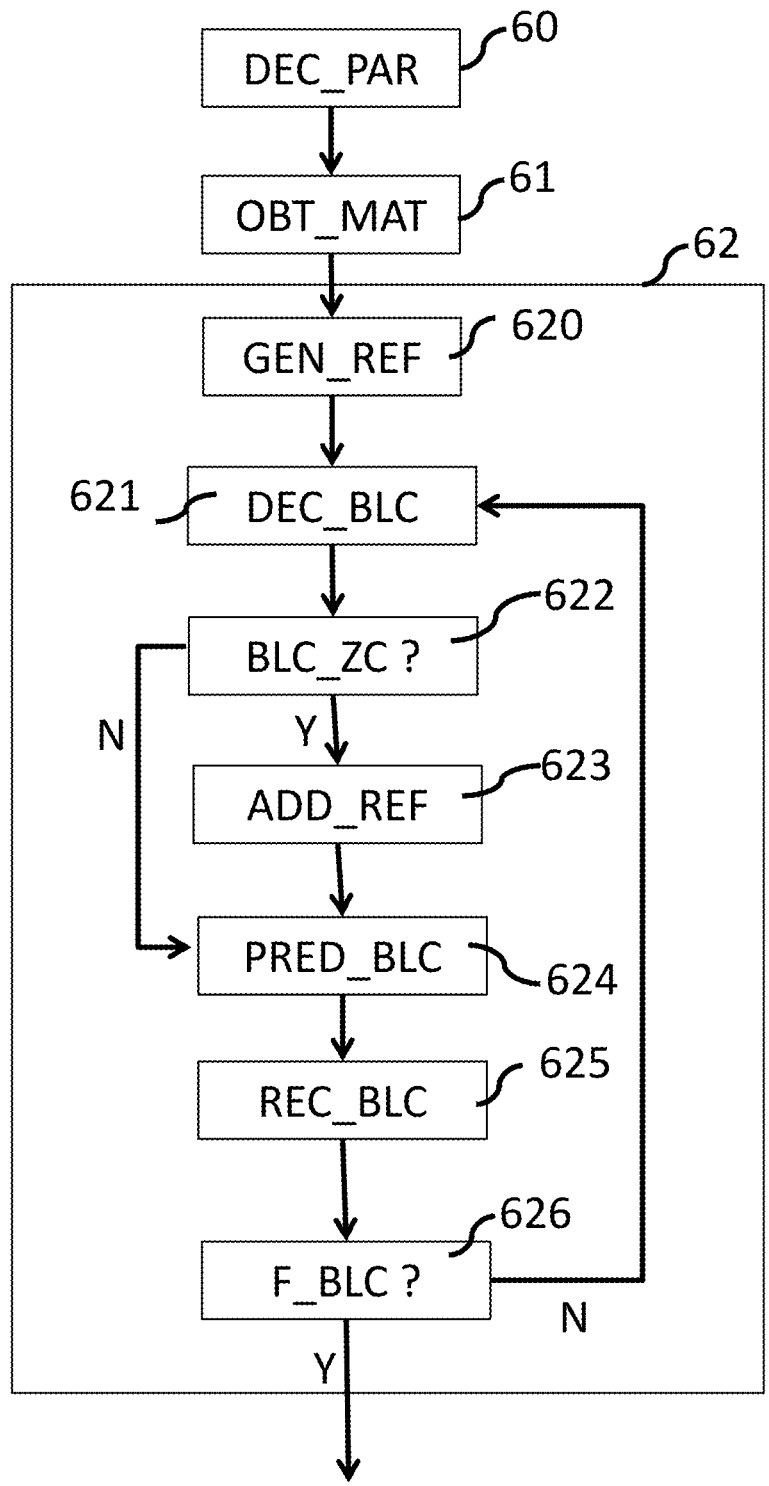

FIG. 6 schematically illustrates steps of the method for decoding an encoded data signal representative of an omnidirectional video according to a particular embodiment of the invention. For example, the encoded data signal was generated according to the encoding method described in relation to FIG. 4. Here the decoding of a current view k, adjacent to a view k−1 is considered. It is also considered that the images of the view k−1 have been previously decoded and reconstructed.

During a step 60, parameters allowing to obtain a homographic matrix $H_{k,k-1}$ representative of the transformation from a plane of the view to be decoded k to a plane of the adjacent view k−1 are read in the signal.

According to one variant, the 9 parameters of the 3×3 homographic matrix $H_{k,k-1}$ are read in the signal. According to another variant, the intrinsic and extrinsic parameters of the cameras of the view k−1 and of the view k are read in the signal, i.e. the focal lengths of the cameras and the separation angle $\theta_{sep}$ between the two cameras.

During a step 61, the homographic matrix $H_{k,k-1}$ is obtained. When the parameters of the matrix are read in the signal, the homographic matrix $H_{k,k-1}$ is obtained directly from these parameters.

When the parameters read correspond to the camera parameters, the homographic matrix $H_{k,k-1}$ is calculated, using equation (3) given above.

Following step 61, the current view k is decoded image by image from the data contained in the data signal. During a step 62, a current image $I_t^k$ of a time instant t of the view k is decoded.

For this purpose, during a step 620, a new reference image $I_{ref}$ is created. The new reference image $I_{ref}$ is created from the pixels of an image $\widehat{I_t^{k-1}}$ at the same time instant t of the adjacent view k−1 and which has been previously reconstructed. The same mechanism as that described in relation to step 420 of FIG. 4 is implemented to create the reference image $I_{ref}$.

The current image $I_t^k$ of the view k is then decoded. For this purpose, the image is cut into blocks of pixels and the blocks of pixels of the image are scanned to be decoded and reconstructed.

For each block $B_k$ of the current image $I_t^k$, the following steps are implemented.

During a step 621, the encoded data of the block $B_k$ are read in the signal. Particularly, when the block $B_k$ is encoded by prediction relative to a reference image comprised in a list of reference images (inter-image prediction), a reference image index is read. Conventionally, for an image encoded by inter-image prediction, the list of reference images comprises at least one image previously reconstructed from the same view as the current image to be reconstructed. Other information can possibly be read in the signal for the current block $B_k$, such as an encoding mode, a movement vector or a disparity information, prediction residual coefficients. Conventionally, the data read for the block is decoded by an entropy decoder. A residue block is obtained by applying to the decoded coefficients a quantisation opposite to that implemented in encoding and, to the de-quantised decoded coefficients, a transform opposite to that implemented in encoding.

During a step 622, it is determined whether the block $B_k$ is located in the active area of the current image. In other words, it is determined whether the block $B_k$ comprises active pixels. According to the particular embodiment of the invention described here, the block $B_k$ belongs to the active area if all the pixels of the block $B_k$ are active, i.e. if all the pixels of the block $B_k$ are in the active area.

If the block $B_k$ belongs to the active area, during a step 623, the new reference image $I_{ref}$ is added in the list of reference images. Otherwise, i.e. if the block $B_k$ does not belong to the active area, the list of reference images for decoding the block $B_k$ is unchanged and only comprises previously reconstructed images of the current view k to be decoded.

During a step 624, the prediction of the block $B_k$ is then calculated conventionally. According to the particular embodiment of the invention described here, advantageously the conventional operation of the decoders for predicting a current block is not modified.

When the block $B_k$ is located in the active area, the new reference image has been added to the list of reference images. Thus, the construction of the prediction block for the current block $B_k$ is carried out by movement or disparity compensation from the movement or disparity information determined for the current block and from the reference image indicated by the reference index read in the signal.

During a step 625, the current block $B_k$ is reconstructed. For this purpose, the prediction block constructed during step 624 is added to the residue block obtained during step 621.

During step 626, it is checked whether all the blocks of the current image have been decoded. If there are still blocks to be decoded, the method goes to the next block in the image to be decoded and returns to step 621. Otherwise, the decoding of the current image ends. The reconstructed current image is stored to serve as a reference image for decoding subsequent images or subsequent views.

In the particular embodiment of the invention described above, it is determined that the block $B_k$ to be encoded or decoded belongs to the active area of the current image if all the pixels of the block $B_k$ are active, i.e. if all the pixels of block $B_k$ are in the active area.

In another particular embodiment of the invention, it is determined that the block $B_k$ belongs to the active area if at least one pixel of the block to be encoded or to be decoded is an active pixel.

According to said particular embodiment of the invention, the encoding and decoding methods are similar when all the pixels of the block to be encoded or to be decoded are active.

The same applies when all the pixels of the block to be encoded or decoded are non-active. According to said other embodiment, for a block to be encoded or decoded comprising at least one active pixel and at least one non-active pixel, the prediction of such a block is adapted.

Figure 7:
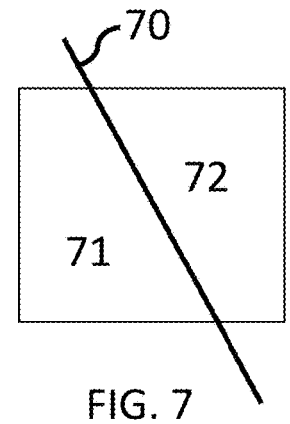
FIG. 7 illustrates an example of a block crossed through the border between an active area and a non-active area of the image to be encoded or decoded, FIG. 8 schematically illustrates a device for encoding an omnidirectional video according to a particular embodiment of the invention, FIG. 9 schematically illustrates a device for decoding an omnidirectional video according to a particular embodiment of the invention, FIGS. 10A-B schematically illustrate an encoded data signal representative of an omnidirectional video according to a particular embodiment of the invention.

FIG. 7 illustrates an example of a block to be encoded or decoded crossed through the border 70 between an active area 71 and a non-active area 72 of the image to be encoded or decoded. For this type of block, when the prediction block determined in steps 424 and 624 of FIGS. 4 and 6 is constructed using the new reference image created in steps 420 and 620, the prediction block then comprises, in the active area 71 of the block, pixels obtained by movement compensation relative to the new reference image and in the non-active area 72 of the block, pixels obtained by movement compensation relative to a previously reconstructed image of the current view comprised in the list of reference images. Thus, for the blocks crossed through the border between the active area and the non-active area:

- a first reference index is encoded in the signal or decoded from the signal, the first reference index corresponding to the index of the reference image used to encode the active area of the block, and
- a second reference index, corresponding to the index of the previously reconstructed reference image of the current view used to encode the non-active area of the block, is encoded in the signal or decoded from the signal.

Figure 10B:
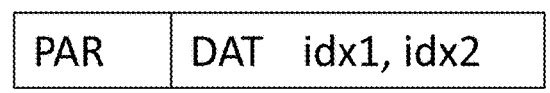

An example of such a signal is illustrated in FIG. 10B. The data signal of FIG. 10B comprises parameters PAR allowing to obtain the homographic matrix representative of the transformation from a plane of the current view to a plane of a neighbouring view. For each image of the current view, encoded data DAT comprise, for at least one block crossed through the border between the active area and the non-active area of the image, two indexes idx1 and idx2 indicating the reference images from a list of reference images, to be used to reconstruct the block.

Alternatively, the second index idx2 is encoded in the signal for the block crossed through the border between the active area and the non-active area of the image, only if the first index idx1 indicates that the reference image to be used for the active area of the block corresponds to the new reference image created in steps 420 or 620. According to this variant, it is not necessary to encode a second index when the reference image used to predict the block is an image previously reconstructed from the current view.

Figure 8:
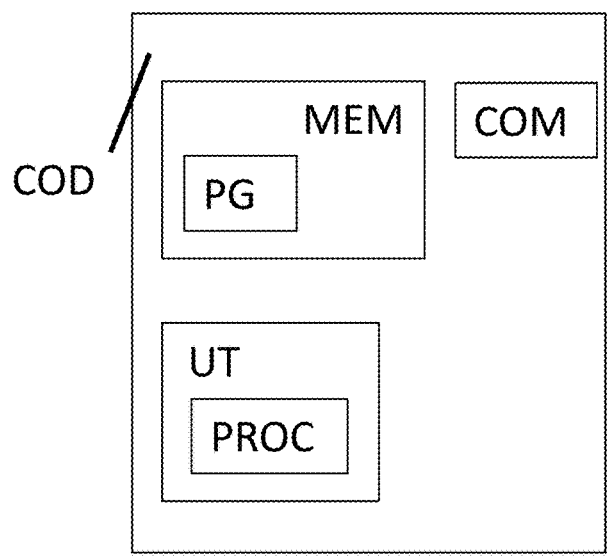

FIG. 8 shows the simplified structure of an encoding device COD adapted to implement the encoding method according to any one of the particular embodiments of the invention described above.

Such an encoding device comprises a memory MEM, a processing unit UT, equipped for example with a processor PROC, and controlled by the computer program PG stored in memory MEM. The computer program PG comprises instructions for implementing the steps of the encoding method as previously described, when the program is executed by the processor PROC.

In the initialisation, the code instructions of the computer program PG are for example loaded into a memory of the processing unit (not shown) before being executed by the processor PROC. The processor PROC of the processing unit UT implements in particular the steps of the encoding method described in relation to FIGS. 4 and 7, according to the instructions of the computer program PG.

According to a particular embodiment of the invention, the encoding device comprises a communication interface COM allowing in particular the encoding device to transmit an encoded data signal representative of an omnidirectional video, via a communication network.

According to a particular embodiment of the invention, the encoding device described above is comprised in a terminal.

Figure 9:
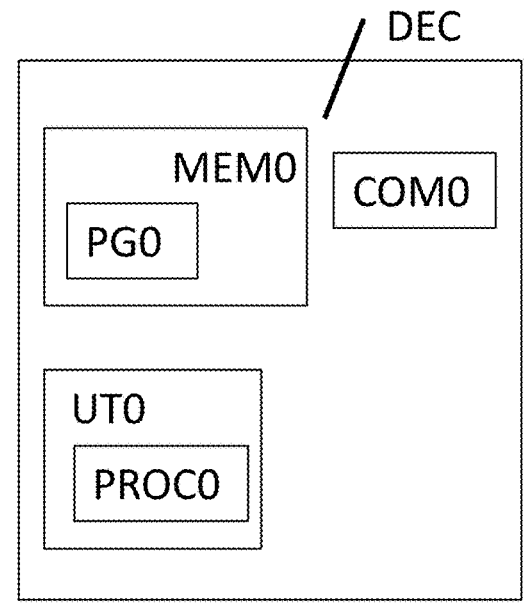

FIG. 9 shows the simplified structure of a decoding device DEC adapted to implement the decoding method according to any one of the particular embodiments of the invention described above.

Such a decoding device comprises a memory MEM0, a processing unit UT0, equipped for example with a processor PROC0, and controlled by the computer program PG0 stored in memory MEM0. The computer program PG0 comprises instructions for implementing the steps of the decoding method as described above, when the program is executed by the processor PROC0.

According to a particular embodiment of the invention, the decoding device DEC comprises a communication interface COM0 allowing in particular the decoding device to receive an encoded data signal representative of an omnidirectional video, via a communication network.

In the initialisation, the code instructions of the computer program PG0 are for example loaded into a memory of the processing unit (not shown) before being executed by the processor PROC0. The processor PROC0 of the processing unit UT0 implements in particular the steps of the decoding method described in relation to FIGS. 6 and 7, according to the instructions of the computer program PG0.

According to a particular embodiment of the invention, the decoding device described above is comprised in a terminal.

The invention claimed is:

1. A decoding method for decoding an encoded data signal representative of a multi-view video sequence representative of an omnidirectional video, the multi-view video sequence comprising at least one first view and one second view, the decoding method being performed by a decoding device and comprising:
    reading in the data signal, parameters allowing to obtain a homographic matrix representative of a transformation from a plane of the second view to a plane of the first view,
    decoding an image of the second view, the image of the second view comprising an area called active area comprising pixels which when said pixels are projected via the homographic matrix onto an image of the first view, are comprised in the image of the first view, the decoding of the image of the second view comprising:
generating a reference image comprising pixel values determined from previously reconstructed pixels of an image of the first view and from the homographic matrix, and
for at least one block of the image of the second view:
reading in the data signal, an index representative of a reference image comprised in a list of reference images comprising at least one image of the second previously reconstructed view and the list of reference images comprising the reference image generated when at least part of said block belongs to the active area,
reconstructing said at least part of said block or said block from said reference image indicated by the index read.

2. The decoding method according to claim 1, wherein said parameters are camera parameters associated respectively with a first camera associated with the first view and with a second camera associated with the second view, the method further comprising calculating said homographic matrix from said camera parameters.

3. The decoding method according to claim 1, wherein said parameters are coefficients of the homographic matrix.

4. The decoding method according to claim 1, wherein when the border of the active area crosses the block to be reconstructed, and the decoding method further comprises:
reading, in the data signal, another index representative of a reference image comprised in the list of reference images, the list of reference images not comprising the generated reference image, the pixels of the block to be reconstructed which do not belong to the active area being reconstructed from pixels of the reference image indicated by the other index read.

5. The decoding method according to claim 1, further comprising:
reading in the data signal, parameters allowing to obtain another homographic matrix representative of a transformation from a plane of the second view to a plane of a third view, at least one pixel of the image of the second view projected into an image of the third view via the other homographic matrix being comprised in the image of the third view,
the generated reference image further comprises pixel values determined from previously reconstructed pixels of the image of the third view and the other homographic matrix.

6. An encoding method for encoding in a data signal, a multi-view video sequence representative of an omnidirectional video, the multi-view video sequence comprising at least one first view and one second view, the encoding method being performed by an encoding device and comprising:
calculating a homographic matrix representative of a transformation from a plane of the second view to a plane of the first view,
encoding, in data signal, parameters allowing to obtain said homographic matrix upon decoding,
encoding an image of the second view, the image of the second view comprising an area called active area comprising pixels which when said pixels are projected via the homographic matrix onto an image of the first view, are comprised in the image of the first view, the encoding of said image comprising:
generating a reference image comprising pixel values determined from previously reconstructed pixels of an image of the first view and from the homographic matrix, and
for at least one block of the image of the second view:
predicting said block or at least part of said block from a reference image comprised in a list of reference images comprising at least one image of the second previously reconstructed view, and the list of reference images comprising the reference image generated when said at least part of said block belongs to the active area,
encoding in the data signal, an index representative of the reference image used to predict said block or said at least part of said block.

7. The encoding method according to claim 6, wherein said parameters are camera parameters associated respectively with a first camera associated with the first view and with a second camera associated with the second view.

8. The encoding method according to claim 6, wherein said parameters are the parameters of the homographic matrix.

9. The encoding method according to claim 6, wherein the encoding method further comprises, in response to the border of the active area crossing the block to be encoded:
encoding, in the data signal, another index representative of a reference image comprised in the list of reference images, said list of reference images not comprising the generated reference image, the pixels of the block to be encoded which do not belong to the active area being predicted from pixels of the reference image indicated by the other index.

10. The encoding method according to claim 6, further comprising:
calculating another homographic matrix representative of a transformation from a plane of the second view to a plane of a third view, at least one pixel of the image of the second view projected into an image of the third view via the other homographic matrix being comprised in the image of the third view,
encoding in the data signal, parameters allowing to obtain said other homographic matrix,
the generated reference image further comprises pixel values determined from previously reconstructed pixels of the image of the third view and the other homographic matrix.

11. A device for decoding an encoded data signal representative of a multi-view video sequence representative of an omnidirectional video, the multi-view video sequence comprising at least one first view and one second view, wherein the decoding device comprises:
a processor; and
a non-transitory computer-readable medium comprising instructions stored thereon which when executed by the processor configure the device to:
read, in the data signal, parameters allowing to obtain a homographic matrix representative of a transformation from a plane of the second view to a plane of the first view,
decode an image of the second view, the image of the second view comprising an area called active area comprising pixels which when said pixels are projected via the homographic matrix onto an image of the first view, are comprised in the image of the first view, said decoding the image of the second view comprising:

generating a reference image comprising pixel values determined from previously reconstructed pixels of an image of the first view and from the homographic matrix, and for at least one block of the image of the second view:
reading from the data signal, an index representative of a reference image comprised in a list of reference images comprising at least one image of the second previously reconstructed view, and the list of reference images comprising the reference image generated when at least part of said block belongs to the active area, reconstructing said block or said at least part of said block from said reference image indicated by the index read.

12. A device for encoding in a data signal, a multi-view video sequence representative of an omnidirectional video, the multi-view video sequence comprising at least one first view and one second view, wherein the encoding device comprises:

a processor; and a non-transitory computer-readable medium comprising instructions stored thereon which when executed by the processor configure the device to:

calculate a homographic matrix representative of a transformation from a plane of the second view to a plane of the first view, encode, in the data signal, parameters allowing to obtain said homographic matrix, encode an image of the second view, the image of the second view comprising an area called active area comprising pixels which, when said pixels are projected via the homographic matrix onto an image of the first view, are comprised in the image of the first view, said encoding said image comprising:

generating a reference image comprising pixel values determined from previously reconstructed pixels of an image of the first view and from the homographic matrix, and for at least one block of the image of the second view:
predicting said block or at least part of said block from a reference image comprised in a list of reference images comprising at least one image of the second previously reconstructed view, the list of reference images comprising the reference image generated when said at least part of said block belongs to the active area, encoding in the data signal, an index representative of the reference image used to predict said block or said at least part of said block.

13. A non-transitory computer-readable medium comprising a computer program stored thereon including instructions for implementing a method for decoding an encoded data signal, when said program is executed by a processor of a decoding device, wherein the encoded data signal is representative of a multi-view video sequence representative of an omnidirectional video, the multi-view video sequence comprises at least one first view and one second view, the instructions configuring the decoding device to:

read in the data signal, parameters allowing to obtain a homographic matrix representative of a transformation from a plane of the second view to a plane of the first view, decode an image of the second view, the image of the second view comprising an area called active area comprising pixels which when said pixels are projected via the homographic matrix onto an image of the first view, are comprised in the image of the first view, the decoding of the image of the second view comprising:

generating a reference image comprising pixel values determined from previously reconstructed pixels of an image of the first view and from the homographic matrix, and for at least one block of the image of the second view:
reading in the data signal, an index representative of a reference image comprised in a list of reference images comprising at least one image of the second previously reconstructed view and the list of reference images comprising the reference image generated when at least part of said block belongs to the active area, reconstructing said at least part of said block or said block from said reference image indicated by the index read.

14. A non-transitory computer-readable medium comprising a computer program stored thereon including instructions for implementing a method for encoding, in a data signal, a multi-view video sequence when said program is executed by a processor of an encoding device, wherein the multi-view video sequence is representative of an omnidirectional video, the multi-view video sequence comprising at least one first view and one second view, the instructions configuring the encoding device to:

calculate a homographic matrix representative of a transformation from a plane of the second view to a plane of the first view, encode, in data signal, parameters allowing to obtain said homographic matrix upon decoding, encode an image of the second view, the image of the second view comprising an area called active area comprising pixels which when said pixels are projected via the homographic matrix onto an image of the first view, are comprised in the image of the first view, the encoding of said image comprising:

generating a reference image comprising pixel values determined from previously reconstructed pixels of an image of the first view and from the homographic matrix, and for at least one block of the image of the second view:
predicting said block or at least part of said block from a reference image comprised in a list of reference images comprising at least one image of the second previously reconstructed view, and the list of reference images comprising the reference image generated when said at least part of said block belongs to the active area, encoding in the data signal, an index representative of the reference image used to predict said block or said at least part of said block.

15. The decoding method according to claim 1, wherein when said block does not belong to the active area, the generated reference image is not comprised in said list of reference images.

16. The encoding method according to claim 6, wherein when said block does not belong to the active area, the generated reference image is not comprised in said list of reference images.

* * * * *